(12) United States Patent
Wolf

(10) Patent No.: US 7,391,208 B2
(45) Date of Patent: Jun. 24, 2008

(54) ROTARY POSITION SENSOR

(76) Inventor: Ronald J. Wolf, 51082 Stratford Ct., Elkhart, IN (US) 46574

( * ) Notice: Subject to any disclaimer, the term of this patent is extended or adjusted under 35 U.S.C. 154(b) by 60 days.

(21) Appl. No.: 11/384,585

(22) Filed: Mar. 20, 2006

(65) Prior Publication Data

US 2006/0208728 A1 Sep. 21, 2006

Related U.S. Application Data

(60) Provisional application No. 60/663,864, filed on Mar. 21, 2005.

(51) Int. Cl.
- *G01B 7/30* (2006.01)
- *H01L 43/00* (2006.01)
- *G01R 33/07* (2006.01)
- *H01L 43/06* (2006.01)

(52) U.S. Cl. .............................. 324/207.25; 324/207.2

(58) Field of Classification Search ............. 324/207.2, 324/207.21, 207.23, 207.24, 207.25; 33/1 PT
See application file for complete search history.

(56) References Cited

U.S. PATENT DOCUMENTS

| | | | | |
|---|---|---|---|---|
| 3,327,541 A | * | 6/1967 | Clark et al. | .................. 74/5.46 |
| 6,310,473 B1 | * | 10/2001 | Zhao | ..................... 324/207.25 |
| 6,731,109 B2 | * | 5/2004 | Johnson et al. | ........... 324/207.2 |
| 6,753,680 B2 | * | 6/2004 | Wolf | ....................... 324/207.2 |
| 7,151,369 B1 | * | 12/2006 | Wolf | ..................... 327/207.24 |
| 2005/0134257 A1 | * | 6/2005 | Etherington et al. | ..... 324/207.2 |

\* cited by examiner

*Primary Examiner*—Reena Aurora
*Assistant Examiner*—Kenneth J Whittington

(57) ABSTRACT

A position sensor for sensing an angular position including at least two magnetic conductive structures, at least two magnets, a magnetic flux responsive device, and an arcuate magnet. The at least two magnetic conductive structures include a first magnetic conductive structure and a second magnetic conductive structure. The first magnetic conductive structure is substantially arcuately parallel with the second magnetic conductive structure. The at least two magnets include a first magnet and a second magnet. The first magnet being magnetically coupled with the first magnetic conductive structure and with the second magnetic conductive structure. The second magnet being magnetically coupled with both the first magnetic conductive structure and the second magnetic conductive structure. The magnetic flux responsive device is constrained to travel a path that is partially located between the first magnetic conductive structure and the second magnetic conductive structure. The path extends beyond at least one of the at least two magnets. The arcuate magnet is positioned concentrically with the path.

12 Claims, 6 Drawing Sheets

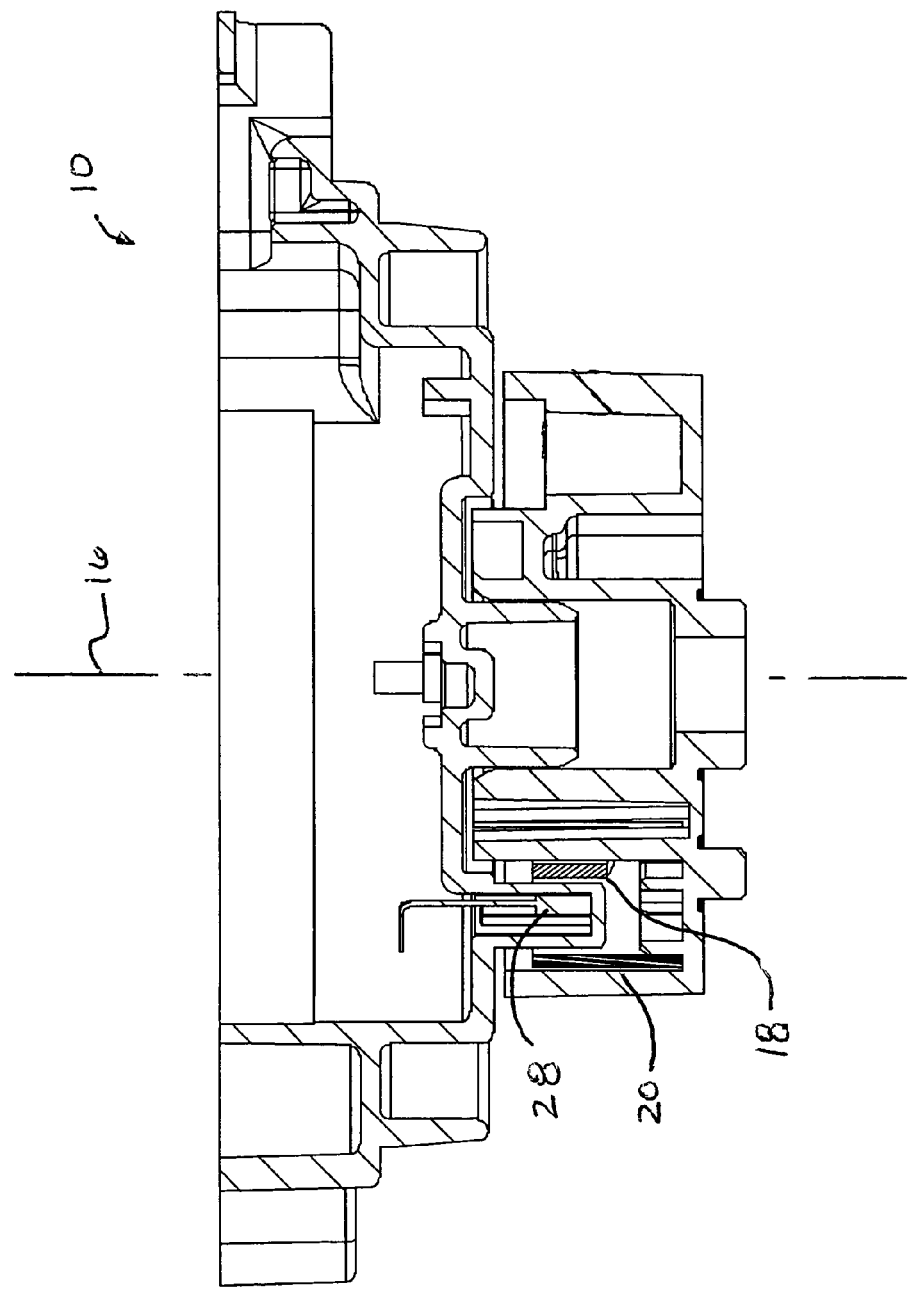

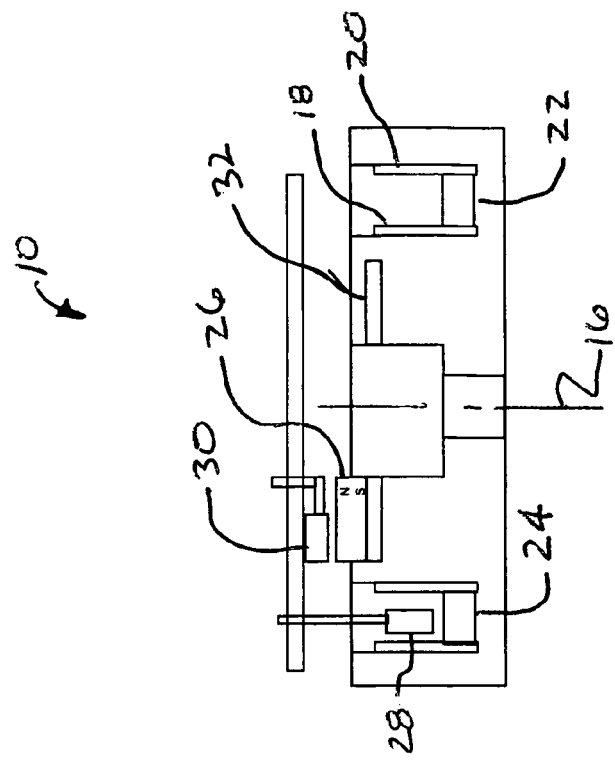
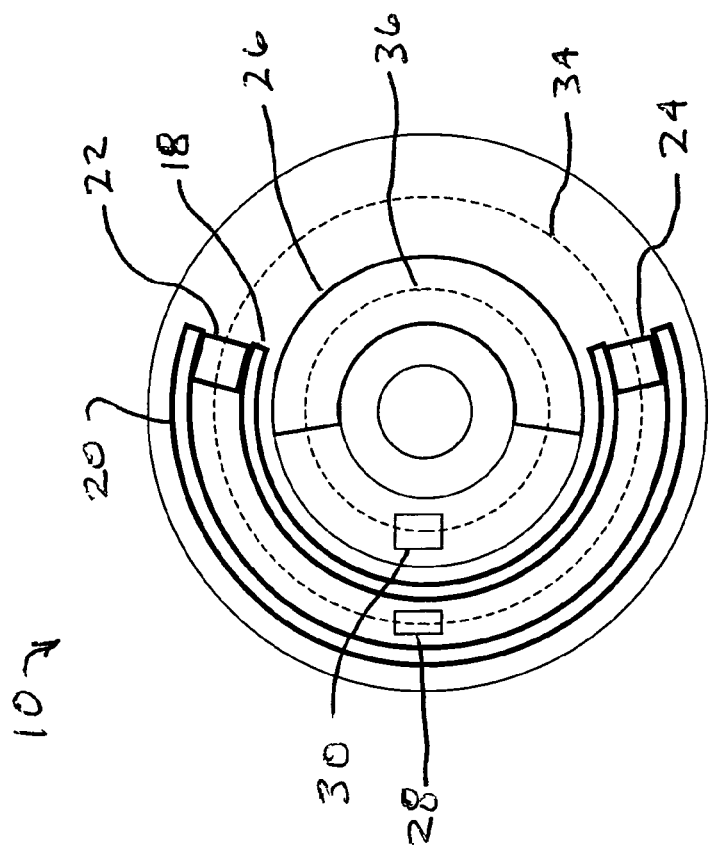
Fig. 5
Fig. 4

ROTARY POSITION SENSOR

CROSS REFERENCE TO RELATED APPLICATIONS

This is a non-provisional patent application based upon U.S. Provisional Patent application Ser. No. 60/663,864 bearing the title "Rotational Sensor Assembly" filed on Mar. 21, 2005.

BACKGROUND OF THE INVENTION

1. Field of the Invention

The present invention relates to electromagnetic sensor assemblies, and, more particularly, to electromagnetic rotary position sensors.

2. Description of the Related Art

Electronic devices are an increasing part of everyday life and they are presently integrated in a large number of products, including products traditionally thought of as mechanical in nature, such as automobiles. To bridge the gap between mechanical movement and electronic control, it is necessary to successfully integrate electronic and mechanical components. This gap is normally bridged by using devices such as sensors and actuators.

Position sensors are used to electronically monitor the position or movement of a mechanical component. The position sensor produces data that may be expressed as an electrical signal that varies as the position or angular displacement of the mechanical component as it changes. Position sensors are an important part of innumerable products, providing the opportunity for intelligent control of mechanical devices.

Various contact-type sensors are known. For example, potentiometers are used to detect a change in electrical signal due to the physical change in position of a wiping contact on a resistive element. Rotational position and movement can be detected by coupling a shaft of a potentiometer to the shaft of a rotating mechanical component. Linear movement can be detected using either a linear potentiometer or a rotating potentiometer that is coupled to a linear-moving component using pulleys and a string or a belt to translate a linear motion to rotational motion. A problem with this type of sensor is the physical wearing of the rotating parts, the wiping contact, and the resistive element cause a drift in the electrical signal and lead to ultimate failure of the device.

Magnetic position sensors are generally a non-contact type of sensor and consist of a magnetic field sensing device, which is usually stationary, and a magnet is attached to a moving component. As the magnet approaches the sensing device, the magnetic field of the magnet is detected and the sensing device generates an electrical signal that is then used for counting, display purposes, recording and/or control purposes. A problem with such sensors is that they depend on a movement of the magnet, and they are not able to provide information as to the static position of a mechanical component.

Other magnetic position sensors provide an indication of the displacement of the mechanical component by using a magnetic field sensing device, which reports the intensity of a magnetic field from a magnet, which is positioned on a mechanical component. The magnet is positioned and the magnetic field sensing device is located relative to the magnet in such a fashion as to cause the magnetic field to vary in the magnetic field sensing device as the magnet moves. A magnetic field sensing device may detect a static magnetic field from a magnet and report the field strength as a representation of the position of the mechanical component.

A magnetic positional sensor developed by the inventor, patented as U.S. Pat. No. 5,818,223, entitled "Rotary Position Sensor with Circular Magnet," discloses a Hall effect device disposed within a cylindrical-shaped magnet, the magnet having a magnetic field that varies from a north pole to a south pole as detected along a circular face of the magnet. The cylindrical magnet is mounted on a rotatable mechanical component and the Hall effect device is positioned inside the cylindrical magnet with an air gap therearound. The Hall effect device has flux concentrators mounted thereto. The magnetic field produced by the cylindrical magnet is detected by the Hall effect device, which in response thereto produces an electrical response representative of the magnet's position, and hence, the mechanical component's angular position.

Another invention of the applicant includes a dual-rail system with magnets located at each end, the rails providing a varying magnetic field therebetween from one end of the rails to the other based upon the magnets associated with each end of each rail.

If the travel of the magnetic flux sensing device is not restrained in some manner, the sensing device may inappropriately come into contact with a magnet or some other structural portion of the sensor.

What is needed in the art is a position sensor, which will provide static and moving positional information without encountering a physical limitation of movement by way of the sensor embodiment.

SUMMARY OF THE INVENTION

This invention relates to a position sensor, which senses the radial position and/or velocity of a mechanical assembly.

The invention, in one embodiment, consists of a position sensor for sensing rotational position including at least two magnetic conductive structures, at least two magnets, a magnetic flux responsive device, and an arcuate magnet. The at least two magnetic conductive structures, include a first magnetic conductive structure and a second magnetic conductive structure. The first magnetic conductive structure being substantially arcuately parallel with the second magnetic conductive structure. The at least two magnets, including a first magnet and a second magnet. The first magnet being magnetically coupled with the first magnetic conductive structure and with the second magnetic conductive structure. The second magnet being magnetically coupled with both the first magnetic conductive structure and the second magnetic conductive structure. The magnetic flux responsive device constrained to travel a path that is partially located between the first magnetic conductive structure and the second magnetic conductive structure, with the path extending beyond at least one of the at least two magnets. The arcuate magnet is positioned concentrically with the path.

An advantage of the present invention is that the magnetic flux responsive device may travel beyond a portion of the device that has a varying magnetic field, thereby resulting in a static output for at least a portion of the magnetic flux sensing device's travel.

Another advantage is that the arcuate magnet provides a biasing field to a magnetic flux responsive device over a portion of its path.

Another advantage of the present invention is that the magnetic flux sensing device may travel beyond the useful sensing range and yet not be damaged by the physical movement. This advantageously allows for use of the sensor in mechanical devices, which may go beyond limits or may break and travel beyond an intended position. If such damage does occur, the sensing usefulness of the invention is not likewise destroyed and may allow continued use of the equipment in spite of the physical damage and/or at least allow the sensing system to control the device.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a cross-sectional view of the rotary position sensor of FIG. 1 along line 3-3;

FIG. 4 is a schematicized top view of the rotary position sensor of FIGS. 1-3;

FIG. 5 is a schematicized cross-sectional view of the rotary position sensor of FIGS. 1-4;

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE PRESENT INVENTION

Figure 1:
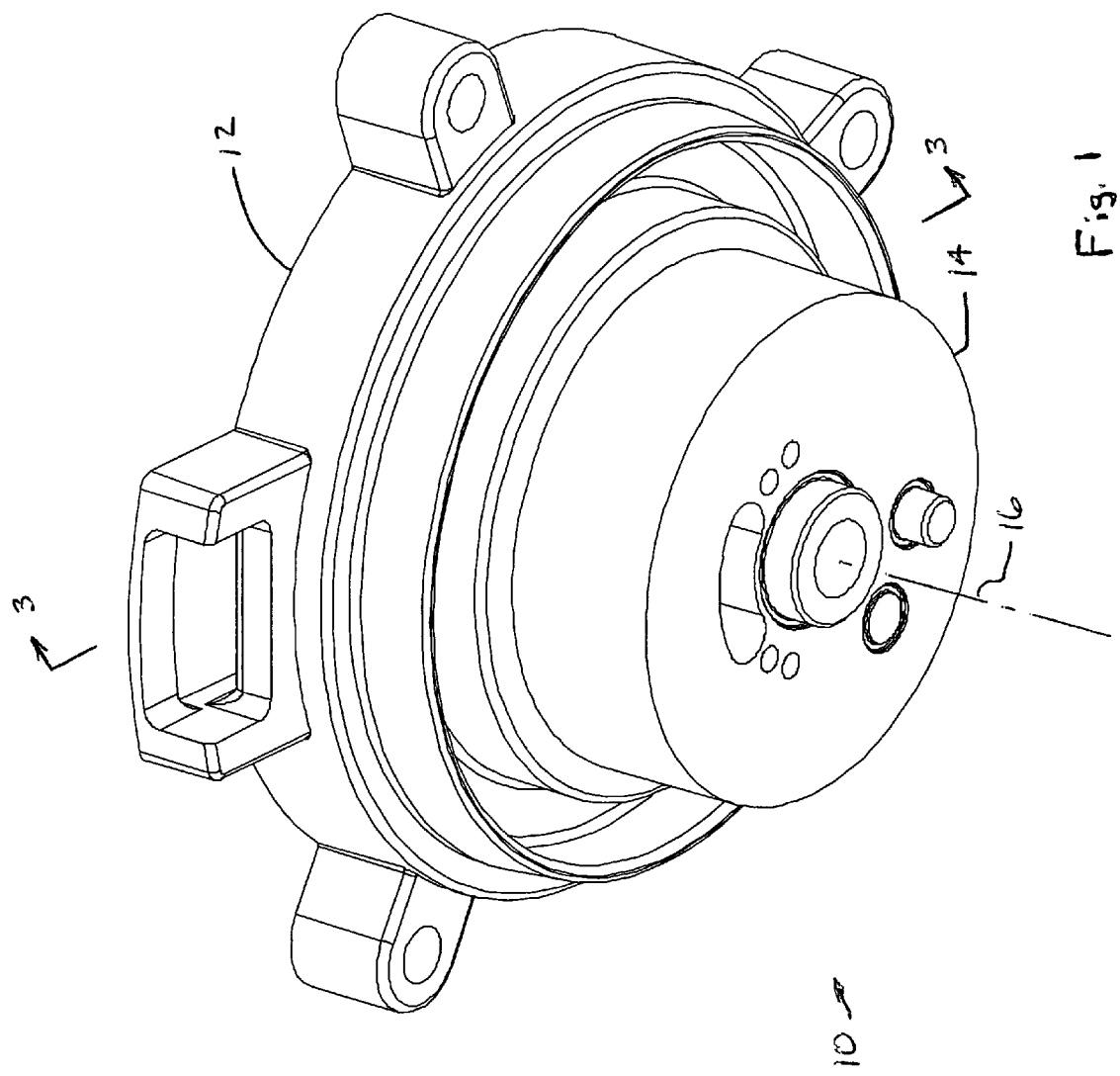
FIG. 1 is a perspective view of an embodiment of the rotary position sensor of the present invention.
Figure 2:
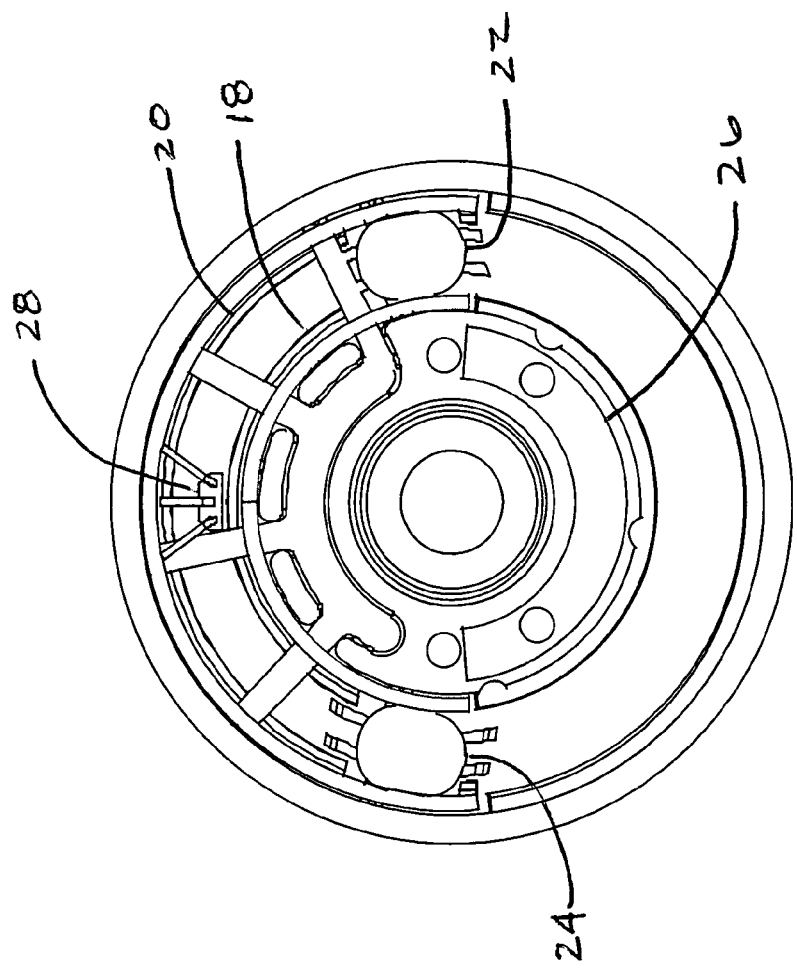
FIG. 2 is an internal view of the rotary position sensor of FIG. 1.

Referring now to the drawings, and more particularly to FIGS. 1-7, there is shown a rotary position sensor 10 including a housing base 12, a rotary housing 14, which rotates about axis 16. Also included in rotary sensor 10 are arcuate rails of a magnetic conductive structure 18 and 20. Between rails 18 and 20 are magnets 22 and 24. An arcuate magnet 26, magnetic responsive devices 28 and 30 and a flux concentrator 32 are also included in rotary position sensor 10. Rotary housing 14 is described as rotating relative to housing base 12, although it is to be understood that housing 12 and housing 14 can each rotate relative to each other.

Magnetic conductive structures 18 and 20, also known as arcuate rails 18 and 20, are depicted as being radially parallel to each other and arranged about axis 16. Magnets 22 and 24 are arranged so that the north pole of magnet 22 is magnetically coupled to inner rail 18 and the south pole of magnet 22 is magnetically coupled to outer rail 20. In a contra arrangement, magnet 24 has a south pole magnetically coupled to inner rail 18 and a north pole connected to outer rail 20. Arcuate magnet 26 has a smaller radius than the radius of arcuate rails 18 and 20 in this embodiment of the present invention; however, the selection of the relative sizes of arcuate magnet 26 and rails 18 and 20 is not important and they can be any relative diameter and may be stacked proximate to each other. The orientation of the magnetic fields of arcuate magnet 26 is perpendicular to the magnetic field of magnets 22 and 24 and the magnetic field in arcuate rails 18 and 20. This substantially perpendicular arrangement of the magnetic field orientations eliminates or at least greatly reduces any crosstalk between the magnetic fields and that which is detected by magnetic responsive devices 28 and 30.

Figure 8:
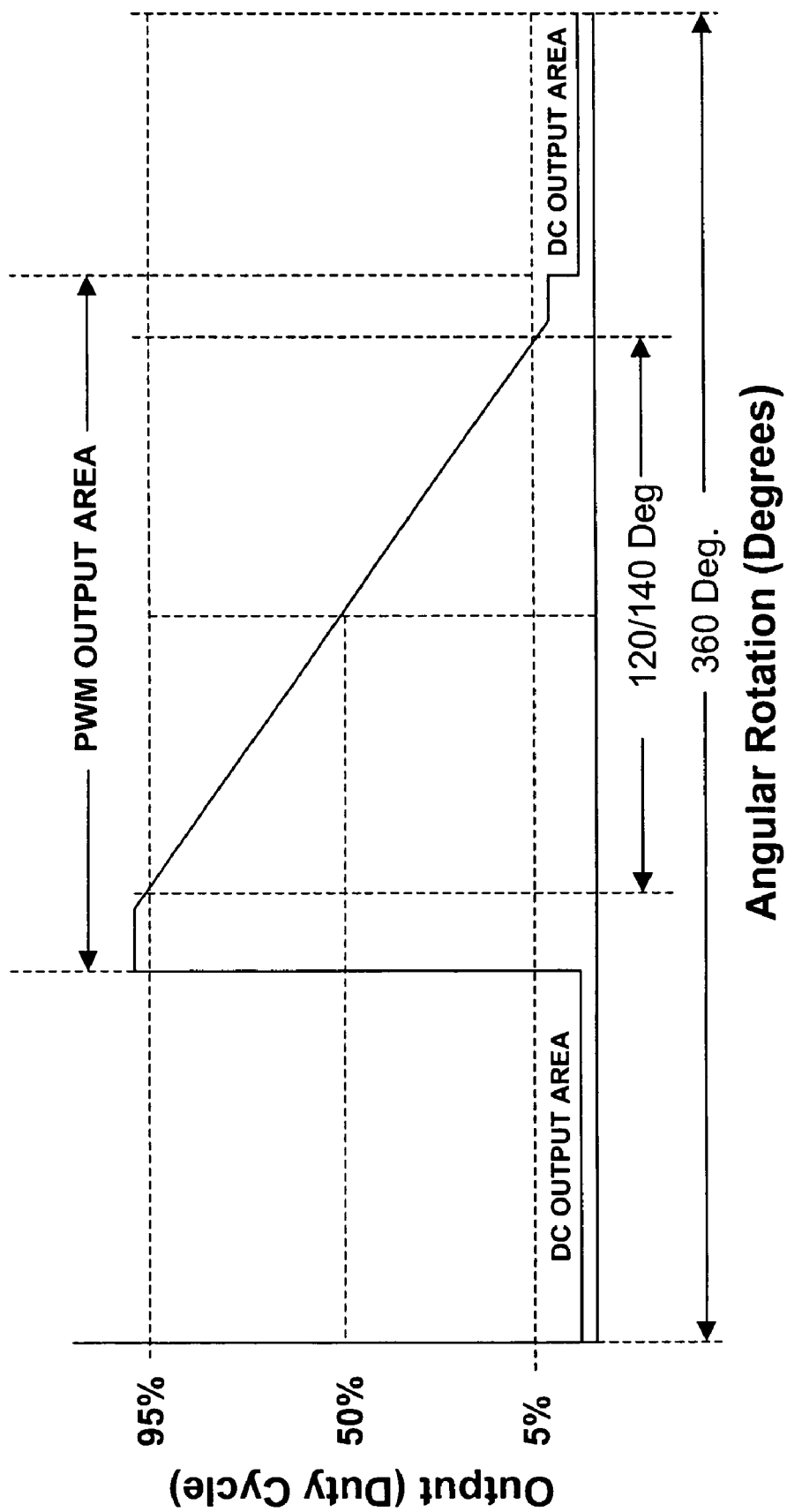
FIG. 8 is an operational representation of an output signal of the rotary position sensor of FIGS. 1-7.

Referring particularly now to FIG. 4, there is shown a path 34 and a path 36, with magnetic responsive device 28 following path 34 and magnetic responsive device 30 following path 36. As can be seen in FIG. 4, paths 34 and 36 are concentric and are substantially circular in nature. Although magnetic responsive devices 28 and 30 are illustrated as being radially oriented with each other, such orientation is purely for the clarity of discussion and magnetic responsive devices 28 and 30 can be angularly separated from each other and in separate planes. As housing 12 moves relative to housing 14, magnetic responsive devices 28 and 30 traverse paths 34 and 36 respectively as they travel about axis 16. As magnetic responsive device 30 passes over arcuate magnet 26, the signal from magnetic responsive device 30, also known as Hall device 30, is strongly biased due to the magnetic field oriented perpendicularly from the surface of the page as shown in FIG. 4. As Hall 28 travels along path 34 it can extend beyond the influence of magnets 22 and 24. Signals can be combined from Hall 28 and Hall 30 to thereby result in a combined signal. The result of the combined signals is depicted in FIG. 8, showing a range in which there is a varying output relative to the position of Hall 28 with respect to arcuate rails 18 and 20 and a DC output area which results from the bias that occurs with Hall 30 being proximate to arcuate magnet 26.

Flux concentrator 32, also known as a pole piece 32, sits adjacent arcuate magnet 26, which extends an opposite field to Hall 30 when Hall 30 is apart from arcuate magnet 26. This is caused by the orientation of the magnetic field, which is oriented as shown in FIG. 5, with one pole extending out of one side and the opposite pole out of the other side of arcuate magnet 26. Flux concentrator 32 may be in the form of a washer having a ferrous composition. In an alternate embodiment flux concentrator 32 may be omitted.

Figure 7:
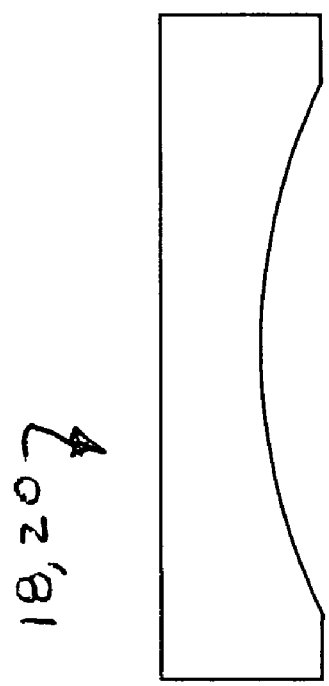
FIG. 7 is a planar view of one rail having been sculpted, the rail being one of the rails contained in the rotary position sensor of FIGS. 1-5.
Figure 6:
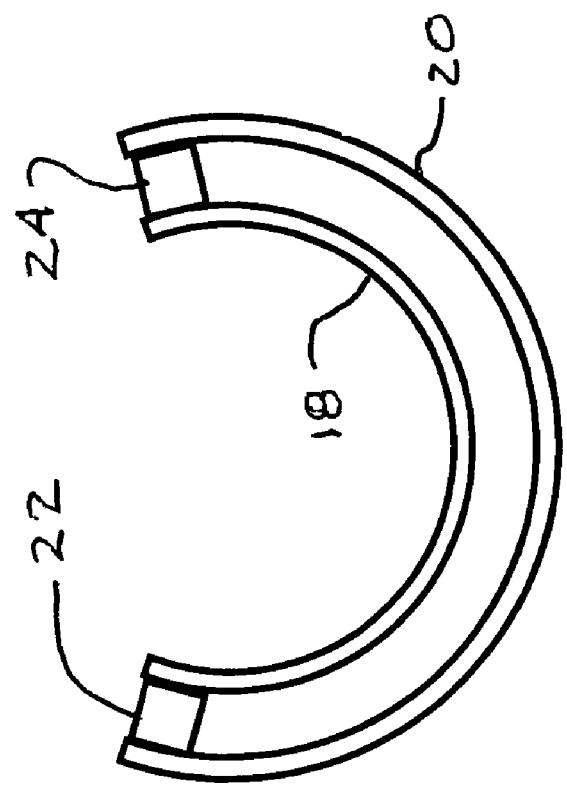
FIG. 6 is a schematical view of the rails of the rotary position sensor of FIGS. 1-5.

As shown in FIG. 7, arcuate rail 18 or 20 is shown in a planar fashion with sculpting being displayed by a narrowing of the lateral dimension over the longitudinal length of rail 18 or 20. Rails 18 and/or 20 may be sculpted to alter the magnetic field that is applied to Hall 28 over its arcuate path. Although only two Halls 28 and 30 are shown, multiple Halls may be positioned at various points along path 34 and/or 36 to provide supplementary and/or combined outputs for different effects. Further, magnets 22 and 24 may be of different magnetic strengths and may be placed proximate the end of rails 18 and 20 or positioned somewhat inwardly from the ends of rails 18 and 20. Magnets 22 and 24 are located beneath the path 34, thereby allowing Hall 28 to traverse past magnets 22 and 24 as they travel about axis 16. Various stages of the structure previously described may be stacked in various fashions with different ending and beginning points to provide a variety of outputs which can be combined to provide a true 360° sensor by way of an interface that coordinates the outputs from the various Hall sensors involved.

While this invention has been described with respect to preferred embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A position sensor for sensing an angular position, comprising:
    at least two magnetic conductive structures, including a first magnetic conductive structure and a second magnetic conductive structure, said first magnetic conductive structure being substantially arcuately parallel with said second magnetic conductive structure;
    at least two magnets, including a first magnet and a second magnet, said first magnet being magnetically coupled with said first magnetic conductive structure and with said second magnetic conductive structure, said second magnet being magnetically coupled with both said first magnetic conductive structure and said second magnetic conductive structure;
    a magnetic flux responsive device constrained to travel a path that is partially located between said first magnetic conductive structure and said second magnetic conductive structure, said path extending beyond at least one of said at least two magnets;
    an arcuate magnet positioned concentrically with said path;
    an other magnetic flux responsive device that travels an other path, said other path being proximate to said arcuate magnet, said other magnetic flux responsive device is biased by said arcuate magnet when said magnetic flux responsive device is not between said first magnetic conductive structure and said second magnetic conductive structure, said other magnetic flux responsive device is additionally biased by said arcuate magnet along a portion of said other path when said magnetic flux responsive device is between said first magnetic conductive structure and said second magnetic conductive structure, a signal from said magnetic responsive device and a signal from said other magnetic responsive device are combined.

2. The position sensor of claim 1, wherein said arcuate magnet has a radius that is smaller than a radius of said magnetic conductive structure.

3. The position sensor of claim 1, further comprising a flux concentrator proximate at least a portion of said arcuate magnet.

4. A position sensor for sensing an angular position, comprising:
    at least two magnetic conductive structures, including a first magnetic conductive structure and a second magnetic conductive structure, said first magnetic conductive structure being substantially arcuately parallel with said second magnetic conductive structure;
    at least two magnets, including a first magnet and a second magnet, said first magnet in contact with said first magnetic conductive structure and with said second magnetic conductive structure, said second magnet in contact with both said first magnetic conductive structure and said second magnetic conductive structure; and
    a magnetic flux responsive device constrained to travel a path that is partially located between said first magnetic conductive structure and said second magnetic conductive structure, said path extending beyond at least one of said at least two magnets, said at least two magnets are not in said path.

5. The position sensor of claim 4, wherein said at least two magnetic conductive structures are each ferrous plates.

6. The position sensor of claim 5, wherein at least one of said ferrous plates is sculptured, thereby altering the magnetic conductivity of said at least one ferrous plate.

7. The position sensor of claim 6, wherein at least one of said magnets are proximate an end of said ferrous plates.

8. The position sensor of claim 6, wherein said magnets are proximate a lateral edge of said ferrous plates.

9. The position sensor of claim 4, wherein said magnetic conductive structures have a first end and a second end, said first magnet being proximate to said first end, said second magnet being apart from said first end and said second end.

10. The position sensor of claim 9, wherein said at least two magnetic conductive structures are each ferrous plates.

11. The position sensor of claim 10, wherein said second magnet has a stronger magnetic field than said first magnet.

12. A position sensor for sensing an angular position, comprising:
    at least two magnetic conductive structures, including a first magnetic conductive structure and a second magnetic conductive structure, said first magnetic conductive structure being substantially arcuately parallel with said second magnetic conductive structure;
    at least two magnets, including a first magnet and a second magnet, said first magnet in contact with said first magnetic conductive structure and with said second magnetic conductive structure, said second magnet in contact with both said first magnetic conductive structure and said second magnetic conductive structure;
    a magnetic flux responsive device constrained to travel a path that is partially located between said first magnetic conductive structure and said second magnetic conductive structure, said path extending beyond at least one of said at least two magnets; and
    at least one more magnetic flux responsive device also constrained to travel said path.

* * * * *